US010366379B2

(12) United States Patent
Crooks

(10) Patent No.: US 10,366,379 B2
(45) Date of Patent: Jul. 30, 2019

(54) REMOTE WEIGH STATION WITH DELAYED FRAUD INTERVENTION

(71) Applicant: NCR Corporation, Duluth, GA (US)

(72) Inventor: John Crooks, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 355 days.

(21) Appl. No.: 15/419,285

(22) Filed: Jan. 30, 2017

(65) Prior Publication Data
US 2018/0218350 A1 Aug. 2, 2018

(51) Int. Cl.
| G06Q 20/20 | (2012.01) |
| G07G 1/00 | (2006.01) |
| G06K 7/14 | (2006.01) |
| G06K 1/12 | (2006.01) |
| G01G 19/414 | (2006.01) |

(52) U.S. Cl.
CPC ....... *G06Q 20/208* (2013.01); *G01G 19/4144* (2013.01); *G06K 1/121* (2013.01); *G06K 7/1413* (2013.01); *G07G 1/0063* (2013.01); *G07G 1/0072* (2013.01)

(58) Field of Classification Search
CPC .. G06Q 20/208; G07G 1/0072; G07G 1/0063; G06K 1/121; G06K 7/1413; G01G 19/4144
See application file for complete search history.

(56) References Cited

U.S. PATENT DOCUMENTS

| 4,964,053 A * | 10/1990 | Humble | A47F 9/048 |
| | | | 186/61 |
| 5,546,475 A * | 8/1996 | Bolle | G06K 9/4647 |
| | | | 382/110 |
| 5,631,976 A * | 5/1997 | Bolle | G06T 5/50 |
| | | | 348/E5.038 |
| 5,867,265 A * | 2/1999 | Thomas | G01N 21/25 |
| | | | 356/328 |
| 6,260,023 B1 * | 7/2001 | Seevers | G01G 19/415 |
| | | | 235/378 |
| 6,363,366 B1 * | 3/2002 | Henty | G01G 19/4144 |
| | | | 382/110 |
| 6,431,446 B1 * | 8/2002 | Gu | G01J 3/28 |
| | | | 235/454 |
| 6,471,125 B1 * | 10/2002 | Addy | G06Q 10/06 |
| | | | 235/385 |
| 6,501,547 B1 * | 12/2002 | Spencer | G01J 3/28 |
| | | | 235/462.06 |

(Continued)

FOREIGN PATENT DOCUMENTS

| EP | 2594911 A2 | 5/2013 |
| JP | 2016 184437 A | 10/2016 |

OTHER PUBLICATIONS

European Search Report issued in copending European Patent Application 17206525.2 dated Feb. 19, 2018.

*Primary Examiner* — Ashford S Hayles
(74) *Attorney, Agent, or Firm* — Schwegman, Lundberg & Woessner

(57) ABSTRACT

Various embodiments herein each include at least one of systems, methods, software, and devices, such as remote weigh stations and ancillary devices thereof enabled to detect fraud possibilities during a product weighing at facilities, such as retail outlets. Some such embodiments include image processing to identify possible fraud.

20 Claims, 6 Drawing Sheets

(56) References Cited

U.S. PATENT DOCUMENTS

| | | | | |
|---|---|---|---|---|
| 6,606,579 B1* | 8/2003 | Gu | G01G 19/4144 | 235/385 |
| 6,658,138 B1* | 12/2003 | Gu | G06K 9/2018 | 382/108 |
| 6,668,078 B1* | 12/2003 | Bolle | G06K 9/4652 | 356/237.1 |
| 7,639,874 B2* | 12/2009 | Bushell | G06K 9/38 | 348/169 |
| 8,746,557 B2* | 6/2014 | Connell, II | A47F 9/047 | 235/383 |
| 8,843,397 B2* | 9/2014 | Nybom | G01G 19/40 | 705/16 |
| 9,173,508 B2* | 11/2015 | Tornwall | A47F 9/047 | |
| 9,505,554 B1* | 11/2016 | Kong | H04N 5/23212 | |
| 9,760,939 B2 | 9/2017 | Gleeson et al. | | |
| 2002/0037104 A1* | 3/2002 | Myers | G06K 9/3258 | 382/187 |
| 2004/0211600 A1* | 10/2004 | Schuller | G01G 19/4144 | 177/25.15 |
| 2004/0262391 A1* | 12/2004 | Harris | G06Q 20/20 | 235/454 |
| 2007/0203808 A1* | 8/2007 | Sekimoto | G06Q 10/08 | 705/28 |
| 2008/0120193 A1* | 5/2008 | Schuller | G01G 19/4144 | 705/23 |
| 2008/0277168 A1* | 11/2008 | Doerwald | G01G 19/4144 | 177/25.15 |
| 2010/0206951 A1* | 8/2010 | Herwig | G01G 19/4144 | 235/439 |
| 2012/0000976 A1* | 1/2012 | Rollyson | G01G 19/4144 | 235/375 |
| 2012/0000978 A1* | 1/2012 | Rollyson | G06Q 30/06 | 235/383 |
| 2012/0312605 A1* | 12/2012 | Teraoka | G01G 19/4144 | 177/25.14 |
| 2014/0046831 A1* | 2/2014 | Sandler | G06Q 20/18 | 705/39 |
| 2014/0263631 A1* | 9/2014 | Muniz | A47F 9/047 | 235/383 |
| 2014/0304156 A1* | 10/2014 | Geller | G06Q 40/00 | 705/43 |
| 2015/0012396 A1* | 1/2015 | Puerini | G06Q 10/0875 | 705/28 |
| 2015/0054959 A1* | 2/2015 | He | G06K 9/00523 | 348/150 |
| 2015/0088677 A1* | 3/2015 | Reed | G07G 1/0036 | 705/23 |
| 2015/0310601 A1* | 10/2015 | Rodriguez | G06T 1/0007 | 348/150 |
| 2016/0101936 A1* | 4/2016 | Chamberlin | G05B 19/402 | 700/214 |
| 2016/0171473 A1* | 6/2016 | Pugh | G06Q 20/208 | 705/23 |
| 2016/0292661 A1 | 10/2016 | Kwan et al. | | |
| 2016/0364623 A1* | 12/2016 | Evans | G06T 5/002 | |
| 2017/0091748 A1* | 3/2017 | Clark | G06Q 20/208 | |

* cited by examiner

REMOTE WEIGH STATION WITH DELAYED FRAUD INTERVENTION

BACKGROUND INFORMATION

Retail shrink mostly comes from customers stealing, cashier sweet-hearting, and employee theft. Item substitution fraud occurring at Self-Service Checkout (SSCO) and Point-Of-Sale (POS) terminals is one of the key shrink issues. Perpetrators commit the fraud by checking out an expensive item (e.g., a bottle of bourbon) as a cheap produce item (e.g., banana). For example, rather than scanning a barcode of an item, the item is placed on a scale, an item type is keyed in or otherwise selected such as bananas, and the item is priced at checkout by weight rather than by the product barcode.

These types of fraud occur primarily at checkout terminal. However, modern retail outlets continually evolve to reduce operating expenses and to provide customers enhanced, or at least differentiated shopping experiences. To these ends, some retail outlets, such as supermarkets, big-box stores, and boutique grocers have begun placing weigh stations in shopping areas where items are sold by weight, such as produce, spices, candy, grains, and the like. These weigh stations include a scale and functions and devices to identify a product being weighed and a label printer to print labels to be affixed to weighed products to enable the products to be priced at checkout, e.g., barcodes, product identifier numbers. Customers are thereby able to choose exactly an amount they want to purchase and scales can even be removed from checkout terminals.

As new solutions are added to the retail environment, such as remote weigh stations, nefarious actors typically move quickly to discover and exploit vulnerabilities.

SUMMARY

Various embodiments herein each include at least one of systems, methods, software, and devices, such as remote weigh stations and ancillary devices thereof enabled to detect fraud possibilities during a product weight at facilities, such as retail outlets.

One embodiment, in the form of a method, includes receiving product identification input, a weight, and an image of an item present on a scale surface of a non-POS weigh station device and processing at least one of the weight and the image in view of the product identification input according to at least one validation process to obtain a validation result. When the validation result indicates validation success, the method includes outputting data to be printed on a scanable label to be affixed to the item. However, when the validation result indicates validation failure, the method includes outputting data to be printed on a scanable label to be affixed to the item to cause a notification to be output upon presentment at a POS terminal indicating the validation failure. The notification to be output at the POS terminal is a notification for a cashier or other attendant to intervene in the transaction to investigate for purposes of fraud prevention. The notification may be output directly from the POS terminal, such as an SSCO or an assisted POS terminal, on from another location or device, such as from an SSCO attendant terminal, supervisor terminal, or other location or device.

Another method embodiment includes receiving a product identifier and an image of an item present on a scale surface of a non-point of sale weigh station device and processing the image in view of the product identifier according to at least one validation process to obtain a validation result. When the validation result indicates validation success, this method includes outputting data to be printed on a scanable label to be affixed to the item. Otherwise this method includes outputting data to be printed on a scanable label to be affixed to the item to cause a notification to be output upon presentment at a point of sale terminal indicating a validation failure.

A further embodiment is a non-point of sale self-service terminal, such as a remote weigh stations. The non-point of sale self-service terminal of this embodiment includes a product scanner including at least one imaging device, an input device, a scale, and a label printer. The non-point of sale self-service terminal also includes a processor and a memory device storing instructions executable by the processor to perform data processing activities. The data processing activities may include receiving a product identifier, from the input device or the product scanner, and an image, from at least one imaging device of the product scanner, of an item present on the scale. The data processing activities further process the image in view of the product identifier according to at least one validation process to obtain a validation result and when the result indicates success, the data processing activities include printing, with the label printer, a scanable label to be affixed to the item. Otherwise, the data processing activities proceed with printing, with the label printer, a scanable label to be affixed to the item to cause a notification to be output upon presentment at a point of sale terminal indicating a validation failure.

DETAILED DESCRIPTION

Figure 1:
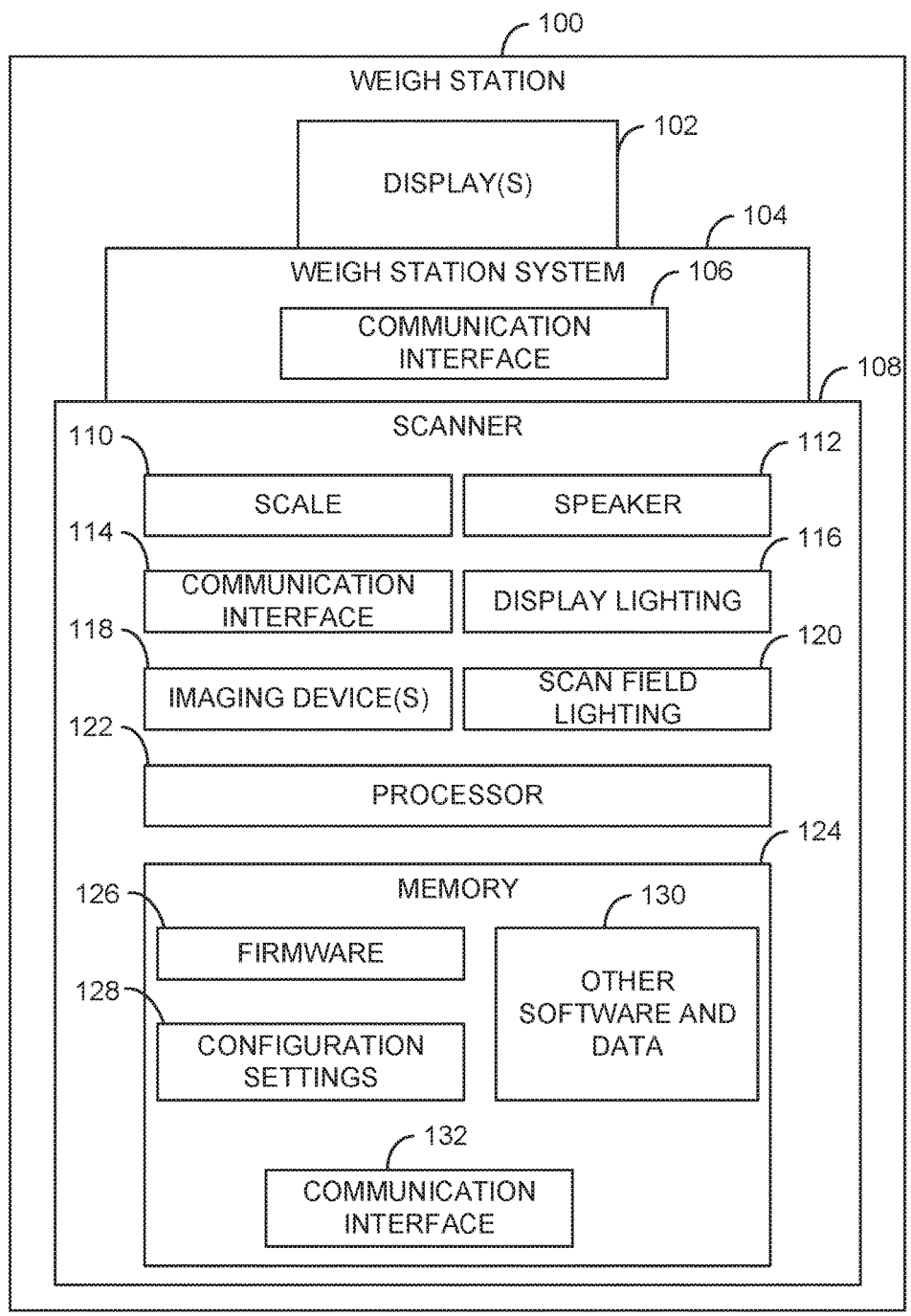
FIG. 1 is a logical block diagram illustrating components of a weigh station having a scanner, according to an example embodiment.

Various embodiments herein each include at least one of systems, methods, software, and devices, such as scales, imaging devices, and product scanners (e.g., barcode scanners), enabled to detect possible fraud during a weighing event at remote weigh stations such as may be deployed at retail outlets. Such embodiments provide reliable results by applying fraud detection processes based on a number of factors, such as known product characteristics that can be measured by a scale, detected in images, and the like. These characteristics of products may be product specific or generalized and associated with a product. Thus, when a customer scans a product at a weigh station or enters an identifier of the product, specific or generalized product characteristics can be obtained and compared against the product presented for weighing. When a mismatch is identified and thereby indicating a potential fraud situation, various embodiment may issue one or more notifications to prevent the fraud from occurring. In one embodiment, a notification requiring employee intervention can be issued immediately. However, other embodiments may encode data printed on a label to be printed by the weigh station to cause the notification to be provided at a checkout station, such as an SSCO terminal or assisted checkout terminal.

The weigh station, in some such embodiments, includes efficient algorithms to enable a product scanner deployed therewith, such as the NCR RealScan 7879 Bi-Optic Imager available from NCR Corporation of Duluth, Ga., other other computing device with at least one imaging device and a scale coupled thereto, to detect possible fraud, such as item substitution fraud, in real-time. Note that item substitution fraud is sometimes referred to as bourbon item substitution fraud. The algorithms of some embodiments achieve an outstanding sub one-second real-time performance by not using an item database, thus, avoiding lengthy database searches and record matching. Instead, the algorithms of some embodiments use insightful, yet lean image processing techniques to swiftly identify the presence, or lack thereof, of certain features present in one or more collected images of an item presented at checkout. Some embodiments may fuse together identified features to boost detection accuracy against item substitution fraud. Some embodiments may also or alternatively include consideration of other factors, such as weight, color, profile shapes, label text, and other features that may be identified from sensors and devices that may be coupled to a remote weigh station.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a diagram illustrating components of a weigh station 100 having a scanner 108, according to an example embodiment. It is to be noted that the weigh station 100 is shown schematically in greatly simplified form, with example components relevant to understanding various embodiments herein. The same situation may be true for the other various components of the weigh station 100. Also, note that the weigh station 100 may include more or fewer components in some embodiments. Additionally, the weigh station 100 may take quite a different form in some embodiments, such as by being a computing device (e.g., a Raspberry Pi board or other small computer) with a scale, an imaging device, and a label printer coupled thereto.

Furthermore, the various components included in the FIG. 1 as illustrated and arranged are provided for illustration purposes only. It is to be noted that other arrangements with more or fewer components are possible without departing from the contributions herein, in particular with regard to automatic and remote scanner configuration.

Moreover, the methods and weigh station presented herein and below may include all or some combination of the components shown in the context of the weigh station 100. Further, although a weigh station 100 is illustrated as including a scanner 108, the scanner 108 may be a stand-alone element or an element of other systems, devices, and terminals in other embodiment. Examples of terminal-types that may include a scanner 108 other than a weigh station 100 are self-service terminals (SSTs) such as SSCO terminals, POS terminals, clerk operated and self-service library checkout stations, time-keeping terminals, and the like. Additionally, references to POS terminals herein and in the claims are general references to both POS and SSCO terminals, unless expressly stated otherwise.

The methods of some embodiments are programmed as executable instructions stored in memory and/or non-transitory computer-readable storage media and executed on one or more processors associated with the components and devices herein.

The weigh station 100 includes one or more displays 102 that present information of a weigh station system 104 coupled to the one or more displays 102. Information presented by the one or more displays 102 includes information relevant in a retail context and with regard to operation of the weigh station 100, such as instructive prompts to enter a product identifier or to scan a product, to place a product on the scale, and to affix a printed label to the product. The one or more displays may also present a measured weight of a product, product information once the product is known from an input identifier or a scan of a barcode, a price per unit of weight, and other information. The weigh station 100 also includes the scanner 108.

The scanner 108 may be referred to as a barcode scanner as that is the task most commonly associated with such devices. During operation of the weigh station 100, items may be placed within a scan field of the scanner 108. One or more imaging devices 118 of the scanner 108, such as one or more of cameras and laser scanners then scan a barcode and information read therefrom is communicated to the weigh station system 104. The weigh station system 104 then uses that data to identify the item placed within the scan field of the scanner 108 and performs an additional function. The additional function may include a price lookup.

The scanner 108 may include one or more scan fields, such as two scan fields of hi-optic scanners that are commonly seen in grocery and discount retail outlets. Each scan field may include one or more imaging devices 118, such as cameras. In some embodiments, a total of four or more cameras may be included in one or both of the scan fields, combined. In addition to the imaging devices 118, the scanner 108 may include various other components. The various other components may include an integrated scale 110 such as may be used in a grocery outlet to weigh items such as produce and one or both of a speaker 112 and display lighting 116 to output audio a visual signals such as signals of (un)successful scans. The scanner 108 may also include scan field lighting 120 that may be turned on and off and adjusted based on a detected presence of an item to be scanned. The scanner 108 also includes one or more of at least one of a hardware communication interface 114 or a software or firmware communication interface 132 that enables to scanner to communicate with at least the weigh station system 104 communication interface 106 and, in some embodiments, over a network.

During typical operation, the scanner 108 is operated according to instructions executed on a processor 122. The processor may be a single or multi-core ASIC, digital signal processor, microprocessor, or other type of processor. The instructions may be firmware 126 or software 130 stored in one or more memories 124. The one or more memories 124 may be or include volatile and non-volatile memories, write-protected memories, write-once memories, random access memory (RAM), read only memories (ROM), and other memory and data storage types and devices.

The instructions as may be stored in firmware 126 or as software 130 in memory 124 are typically executed according configuration settings stored in the memory 124. The configuration settings 128 configure operation of the scanner 108 and the various components therein. For example, the configuration settings 108 may configure speaker 112 volume, display lighting 116 outputs, scan field lighting 120 brightness, decoding algorithm of the imaging device(s) 118 and the instructions, one or more communication protocols used to communicate data from the scanner 108 to the weigh station system 104, such as via a wired or wireless communication interface 106 of the weigh station system 104, scale 110 operating parameters (e.g., unit of measure as ounces, pounds, grams, kilograms), among other configuration settings of the particular scanner 108 an embodiment may include. In some embodiments, the configuration settings 128 may include a firmware version, a software version, and the like. Thus, when a configuration is set or updated, the setting or updating of the configuration settings 128 may include population and updates of any of the configuration settings 128 of a particular embodiment, including an update to firmware and software present on the scanner.

In some embodiments, the configuration settings 128 stored in the scanner 108 memory 124 may include configuration settings 128 for one or more fraud detection processes, such as one or more item substitution fraud detection processes. The one or more fraud detection processes, including the item substitution fraud detection processes, may be process stored as software 130 or firmware 126 within the memory 124 or other device within the scanner 108 or the weigh station system 104. These fraud detection processes are typically triggered for execution upon receipt of a command from the weigh station system 104, such as upon receipt of input into the weigh station system 104 to weigh a presented item on the scale 110. The fraud detection processes, which may be executed by the processor 122 or a processor of the weigh station system 104, operate against images received from the one or more imaging device 118 cameras or other cameras that may be coupled to either the weigh station system 104 or the scanner 108.

The fraud detection processes may be defined in the software 130 or firmware 126. In some embodiments, the item substitution fraud detection processes are generic processes that may be flexibly configured within configuration settings 128 or configuration settings of the weigh station system 104. For example, some embodiments may include one or more item substitution fraud detection processes that are simply defined within the software 130 when the software is authored. Some of these processes may be modified through the configuration settings 128. In some other embodiments, the item substitution fraud detection processes are a collection of different processes in the software 130 or firmware 126 that may be linked together by configuration settings 128 to form larger, conditional item substitution fraud detection processes. In other embodiments, fraud detection processes may be accessed via a network by providing one or both of data and images to a cloud-based fraud detection resource. Regardless of the form and configuration of the fraud detection processes, the fraud detection processes generally process data images captured by imaging device(s) 118 and the scale 110 to identify features of presented items represented therein. In some embodiments, the fraud detection processes operate to determine whether the weight of the item is within a reasonable range for the product presented for weighing or whether a presented item is a manmade item or a produce item. For example, it is unlikely someone would be purchasing two pounds of a spice. Further, determining whether an item is manmade generally includes identifying features in images that rarely, if ever, occur in natural products, such as produce. Such features may include straight lines, parallel lines, certain shape silhouettes, glare or an amount or size of glare occurrences, among other features.

Figure 2:
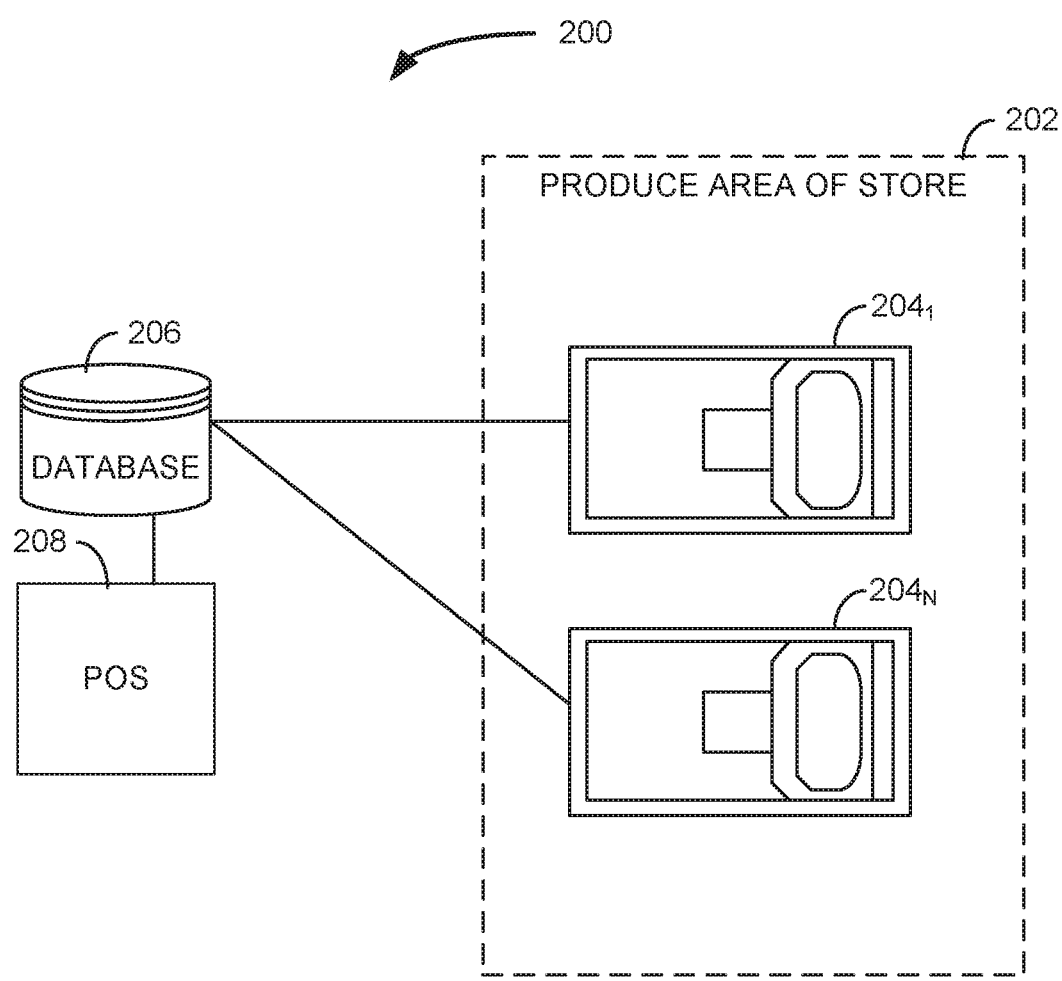
FIG. 2 is a logical block diagram of a system architecture including at least one weigh station, according to an example embodiment.

FIG. 2 is a logical block diagram of a system 200 architecture including at least one weigh station $204_{1-N}$, according to an example embodiment. The system 200 is deployed in a retail outlet, such as a grocery store. The system 200 includes at least one weigh station $204_{1-N}$ typically deployed in a produce area of a grocery store or other area where items are sold per unity of weight. The weigh station(s) $204_{1-N}$ may be connected to a network in some embodiments to perform tasks such as price lookups to obtain a current price of a product when presented or periodic retrievals of product pricing data for local storage, such as daily. In some embodiments, a weigh station $204_{1-N}$, when weighing an item presented on a scale thereof for pricing, performs at least one validation process to verify the item presented matches a product identifier either manually input or received from a product scanner that scanned a barcode affixed to the presented item. When a match is verified, at least within a certain probability, a price for the item may be determined and a label printed to be affixed to the item for scanning at a checkout terminal. However, when a match is not verified, such as when the item does not match the product of the product identifier or the match has a probability lower than an acceptable threshold, fraud prevention is triggered. The fraud prevention may simply include locking the weigh station $204_{1-N}$ and requesting an employee to intervene to resolve the issue. However, for many reasons, an intervention at that time may not be desired. For example because the cause might simply be a customer error, no law has been broken or loss incurred yet, staffing a weigh station $204_{1-N}$ area may not be desired, among other reasons. In such situations, a label may still be printed, but the label is scanned at a checkout station, an intervention will be initiated to resolve the potential fraud issue.

Thus, when a label is generated and printed for a presented item, the weigh station $204_{1-N}$, in some embodiments, may upload all or a portion of the label data to a price lookup or other store database 206. Also uploaded to the database 206 may be images and other sensor data (e.g., weight) related to the transaction at the weigh station $204_{1-N}$ to make that data available for review by security personnel prior to or when the customer presents the item at checkout. Security personnel may then clear identified fraud potential if fraud is not involved through verification of the pictures, may monitor the individual customer while in the store, summon law enforcement authorities, or take other action. Additionally, the images may be used as evidence, for training, and further fraud detection process development and refining. Subsequently when the customer presents the item for purchase at checkout, the checkout terminal may retrieve the data associated with the label from the database 206 or that data may have been encoded in the barcode printed and affixed to the item.

In some embodiments, a customer bags and weighs produce, such as a bag of green beans, and presents them for weighing at a weigh station $204_1$ in the produce department. A controller of the weigh station $204_1$ retrieves the produce item price-per-weight (e.g., pound) from the database 206 or from a local memory, and calculates the cost. The weigh station $204_1$ controller may then analyze the items being weighed for possible fraud scenarios as embodied in one or more fraud detection processes that may be local to the weigh station $204_1$ or accessed as web services or other processes on a network. The weigh station $204_1$ controller may then print a barcode for the customer to affix to their bag of produce. The weigh station controller $204_1$ may also store the price, weight, and fraud detection analysis results in, or associates them with, the printed barcode, such as by storing them to the database 206. The customer may then finish their shopping, and proceeds to a POS terminal 208, cashier assisted, SSCO, or otherwise. The printed barcode affixed to the produce bag is then scanned and need not be weighed. A POS terminal 208 controller retrieves the price, weight, and fraud detection analysis results from the produce barcode or from the database 206, considers the fraud detection data, and triggers a customer assistance intervention if fraud potentially present. In some SSCO embodiments, a weight of the item may be requested and verified, as well as performance of additional fraud detection processing.

Figure 3:
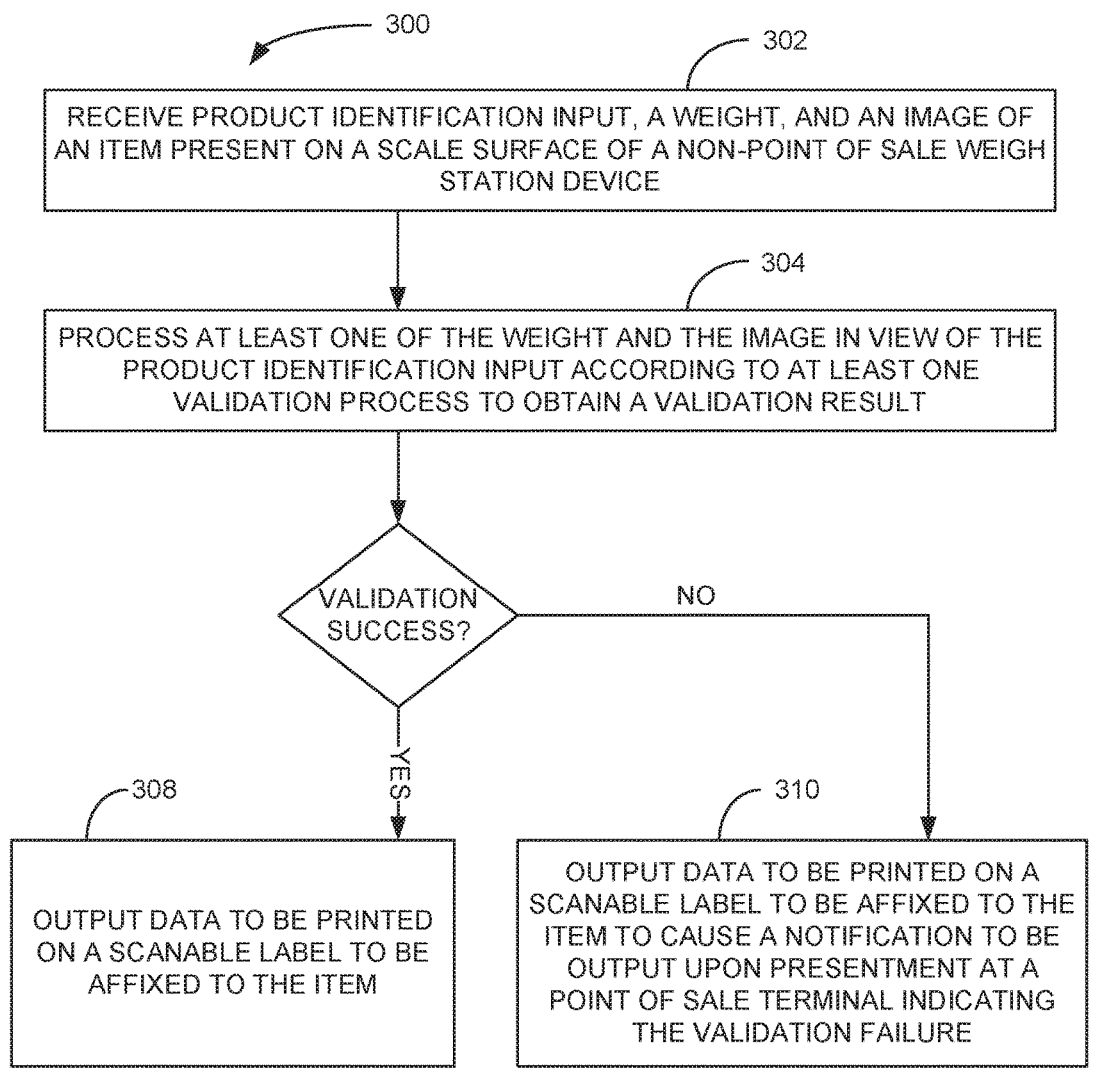
FIG. 3 is a block flow diagram of a method, according to an example embodiment.

FIG. 3 is a block flow diagram of a method 300, according to an example embodiment. The method 300 is an example of a method that may be performed in whole or in part on a controller or other computing of a weigh station or within a scanner that is part of a weigh station, in various embodiments.

The method 300 includes receiving 302 product identification input, a weight, and an image of an item present on a scale surface of a non-point of sale weigh station device and processing 304 at least one of the weight and the image in view of the product identification input according to at least one validation process to obtain a validation result. In such embodiments, when the validation result indicates validation success, the method 300 includes outputting 306 data to be printed on a scanable label to be affixed to the item. Otherwise, when the validation result indicates validation failure, the method 300 includes outputting 308 data to be printed on a scanable label to be affixed to the item to cause a notification to be output upon presentment at a point of sale terminal indicating the validation failure.

In some embodiments of the method 300, the product identification input includes at least one of a price per unit of weight and a product identifier to retrieve product data. Also, the product data retrievable with the product identifier may include a price per unit of weight and product property data that is utilized by the at least one validation process to perform validation that a product presented matches the received product identification input. The price per unit of weight may be retrieved based on at least a portion of the product identifier from a memory device of the non-point of sale weigh station device.

In another embodiment of the method 300, the product identification input is received 302 as a data item read by a scanning process or device from the image of the item present on the scale. The validation process in some of these and other embodiments may include a set of validation processes that each execute to identify one or more properties of an item presented on the scale surface as captured in the received 302 image. Note that the received 302 image may be one or a plurality of images in different embodiments. Also, when there is only one image, the one image may include a composite view with each view captured by a different imaging device or a single imaging device that captures the composite view through an arrangement of mirrors. Additionally, in other embodiments, one or more captured images may be moving images (i.e., video, video clips, etc.).

In some embodiments, one validation process may be performed on the received 302 image to remove a background of the image leaving only the item presented on the scale surface. The image, with the background removed may then be used to perform at least one additional validation process that outputs the validation result. The validation result may include or be based at least in part on an indication of whether the presented item is a naturally occurring or man-made item. In some such embodiments, the at least one additional validation process may include one or more of a silhouette detection process, a glare detection process, a straight line process, and a parallel line process, among others.

The silhouette detection process may process an image to leave a silhouette of the presented item which is then compared to a reference model of a man-made item and when relatively matched, outputs an indication the presented item is likely man-made. The glare detection process may evaluate areas within the presented item image portion for distinct occurrences of glare and when a number of glare occurrences larger than a first threshold is greater than a second threshold, an indication the presented item is likely man-made may be output. In both the straight and parallel line process, a Hough transform may be performed on the image of the presented item and then one or both of the straight-line detection and parallel line detection process may be performed thereon. When the straight line detection process identifies a number of straight lines longer than a length threshold greater than a count threshold, an indication the presented item is likely man-made may be output. When the parallel line detection process identifies at least two parallel lines that each have at least a minimum length and separated by at least a minimum distance, outputting an indication the presented item is likely man-made.

In some embodiments of the method 300, the received 302 image is one of a plurality of received 302 images where each image captured either from a different angle, zoom, or resolution. In one such embodiment, at least one of the silhouette detection, glare detection, straight line detection, and parallel line detection processes are performed on at least two images and the output 308 of the indication that the presented item is likely man-made is output 308 only upon reaching the same conclusion through the respective process upon processing at least two images. In some of these and other embodiments, when an output 308 of only one of the silhouette detection, glare detection, straight line detection, and parallel line detection processes output an indication that the presented item is likely man-made with regard to only a single image, the method 300 may include performing further processing 304 with regard to that single image to identify at least one additional feature present therein to confirm that the item present in the image is man-made. The method 300 in such embodiments may then output 308 an indication that the presented item is likely man-made when the at least one additional feature is present in the image.

In some of these background removal embodiments, removing the background may include down sampling each image, of one or more received 302 images, to a lower resolution and subtracting a background reference image from) a current image. The background reference image subtracted in this process is of an identical resolution and captured by a respective camera that captured the current image. A pixel-by-pixel comparison may then be performed between reference image pixels and current image pixel and removal of the pixel from the current image may be done when the difference between current image pixel value and the reference image pixel value is lesser than a threshold. The threshold value may be variable in some embodiments and determined based on the value of one of the current image and reference image pixel values.

Figure 4:
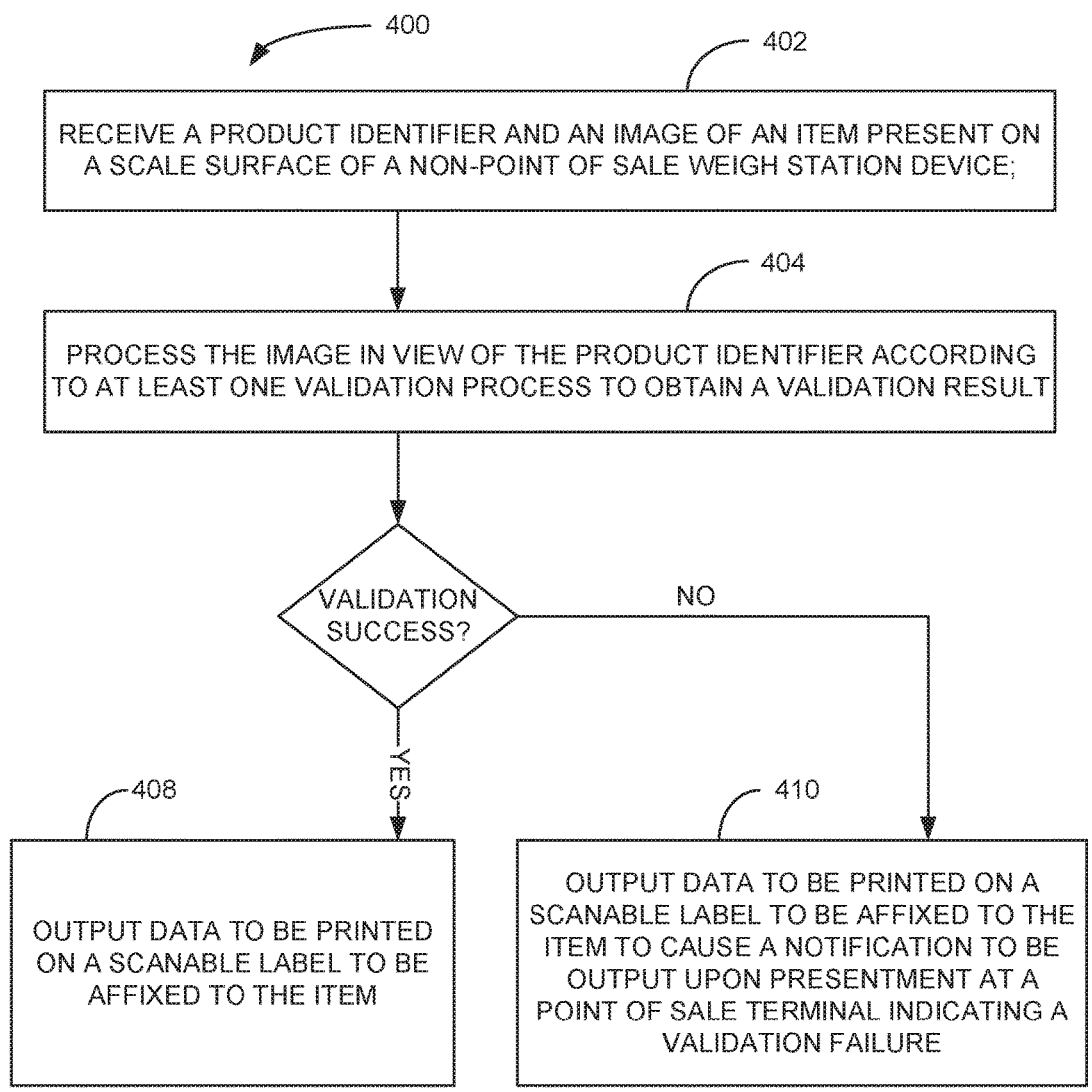
FIG. 4 is a block flow diagram of a method, according to an example embodiment.

FIG. 4 is a block flow diagram of a method 400, according to an example embodiment. The method 400 is another example of a method that may be performed on or at a weigh station. The method 400 includes receiving 402 a product identifier and an image of an item present on a scale surface of a non-point of sale weigh station device and 404 processing the image in view of the product identifier according to at least one validation process to obtain a validation result. When the validation result indicates validation success, the method 400 outputs 406 data to be printed on a scanable label to be affixed to the item. Otherwise the method 400 outputs 408 data to be printed on a scanable label to be affixed to the item to cause a notification to be output upon presentment at a point of sale terminal indicating a validation failure.

Figure 5:
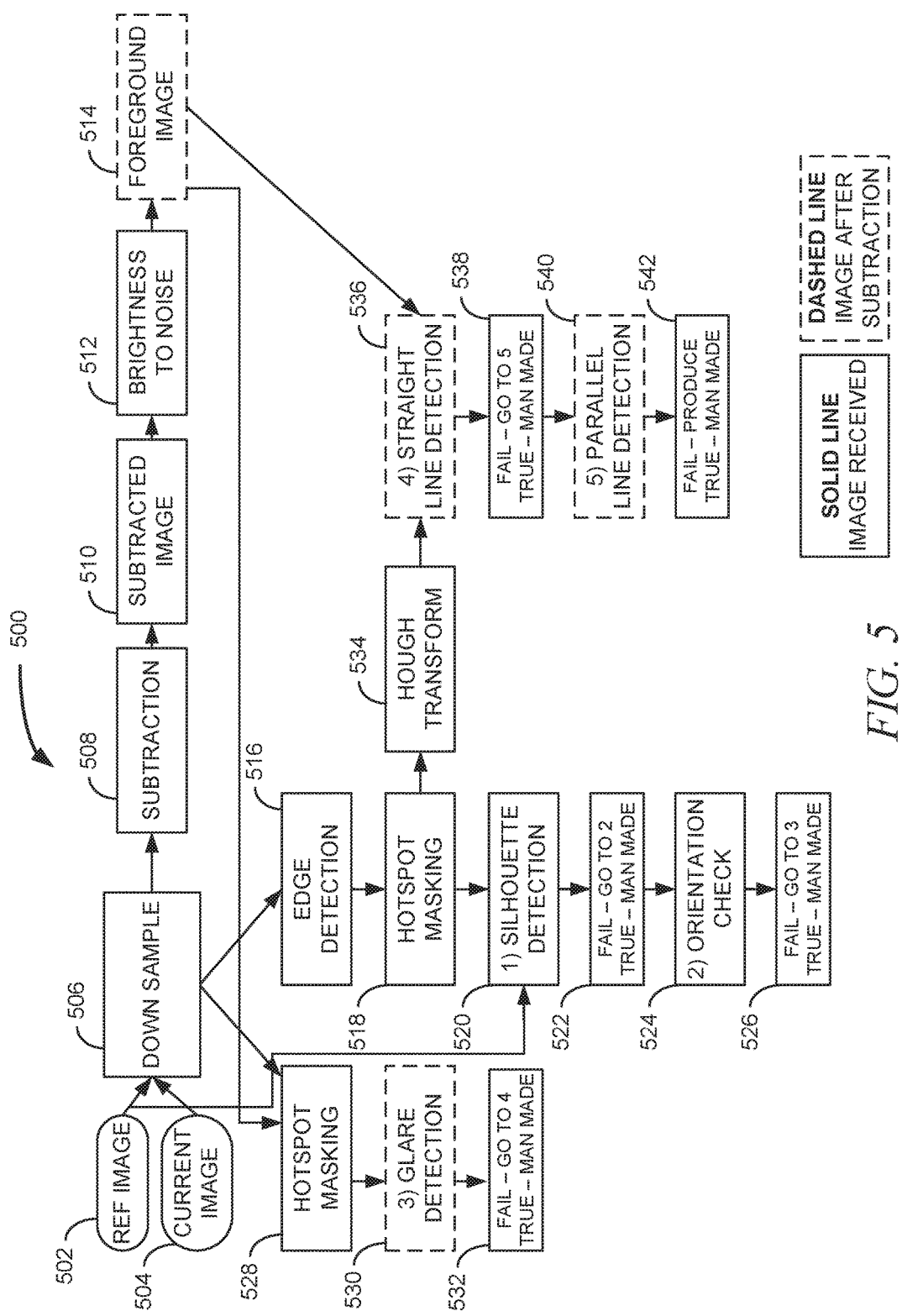
FIG. 5 is a block flow diagram of a method, according to an example embodiment.

FIG. 5 is a block flow diagram of a method 500, according to an example embodiment. The method 500 is an example of an item substitution fraud detection process that is provided as an example of one fraud detection process that may be performed in some embodiments. Other fraud detection processes may also or alternatively be performed in some embodiments.

The method 500 is an example of an item substitution fraud detection process that is made up of several sub-processes, which themselves may be referred to herein as processes. The method 500 may be defined in software or firmware within a scanner as described above. In some other embodiments, the method 500 may be defined in scanner configuration settings that reference and interrelate the included sub-processes. In some embodiments, the method 500 is defined to determine if an item presented at a weigh station is an item of produce or is a man-made item. The method 500 may be triggered on a scanner upon receipt of input indicating an item is presented for weighing. When the item presented is determined to be man-made rather than produce or other non-man-made item when the item presented is supposedly produce, a signal is returned by the process to perform one or more actions, such as not accepting the item, freezing the weigh station, or other actions as described above.

The method 500 in some embodiments includes receiving at least one reference image 502 and at least one current image 504. As a scanner or a weigh station in general may include a plurality of cameras, the number of reference images 502 and current images received may be dependent upon the number of cameras, in some embodiments. In typical embodiments, a reference image 502 is stored in a scanner memory for each scanner camera. A reference image 502 is an image captured by a respective camera at a time when no items are present within the field of view. A reference image 502 therefore generally is a representation of a background that will be included in a current image captured by the respective camera. Thus, in some embodiments, when a current image 504 is received from a camera, a reference image 502 for the respective camera can be retrieved from memory and is therefore received by the method 500.

The current image 504 may then be down sampled 506 to a lower resolution. The reference image 502 may also be equally down sampled 506 in some embodiments. However, the reference image 502 may have been previously down sampled 506 in some embodiments. In some embodiments, the down sampling 506 is a pyramidal down sampling that is performed in a 2×2 manner to combine vertically adjacent pixels and horizontally adjacent pixels. The down sampling 506 may be performed once, twice, three, four, or more times, depending on the size of the received current image 504 and reference image 502, when the reference image is down sampled 506. The amount of down sampling 506 performed may also be dependent upon the amount of processing resources and utilization load of processing resource on the weigh station or other device performing the method 500.

After the down sampling 506 is complete, the reference image 502 may be subtracted 508 from the current image 504. As the current image 504 is captured by the same camera as the reference image 502, the current image includes a presented item and background therein. The subtracting 508 therefore may identifying pixels between the two images that have identical values and remove those pixels from the current image 504. The result is a subtracted image 510 that includes only the presented item and other things that are in the current image but not previously present in the reference image 502, such as a portion of a body of a person presenting the item.

The subtracted image 510 is then processed by a brightness-to-noise process 512. The brightness to noise process 512 performs a pixel-by-pixel comparison of pixel values between pixels of the subtracted image 510 and corresponding pixels of the reference image 502. In some embodiments, when a difference between two pixels reveals the subtracted image 510 pixel having a brightness value greater than the corresponding reference image 502 pixel by an amount less than a threshold, the pixel is removed from the subtracted image 510. This threshold, in some embodiments, is variable based on a brightness value of the pixel in either the reference image 502 or the subtracted image 510. For example, the threshold may be determined in whole or in part as a percentage of the brightness of one of these pixels. This may be a five percent threshold in some embodiments, such that the difference in brightness value must be more than five percent of a brightness value of the reference image 502 pixel. Once the pixel-by-pixel comparison is complete, a foreground image 514 remains that includes only an item presented.

Next, or in parallel to the described operations of the method 500 since the reference image 502 and current image 504 were down sampled 506, the method 500 includes performing edge detection 516 processing on the current image 504. The edge detection 516 processing may be performed against a copy of the current image 504 as received or against a down-sampled 506 copy. Hotspot masking 518 may then be performed to adjust pixel brightness in areas of the image being processed to adjust for known bright areas of the image. The hotspot masking 518, in some embodiments, may adjust pixel brightness higher or lower. The hotspot masking 518 may be performed according to one or more configuration settings in some embodiments. At this point, the image will include edges of items present in the original received current image 504 with the edge represented as lines.

Next, silhouette detection 520 is performed on the image in view of one or more reference models of man-made items, and other items in some embodiments. The one or more reference models utilized by the silhouette detection 520 each include a silhouette of interest, such as a silhouette of a man-made item, which may be silhouette of a bottle, a box, or other item. A reference model utilized in silhouette detection 520 may also be referred to as a model or a silhouette model. The silhouette detection 520 operates to determine if a silhouette of a reference model is present as lines remaining in the image being processed. As a distance of an item present in a current image is dependent upon a distance from a camera that captured the image, a silhouette of a reference model may be scaled to determine of a match can be found at different relative sizes.

When no match is found by the silhouette detection 520, the process fails at 522 and the processing may continue to an orientation check 524. When a match is found, the method 500 outputs a signal at 522 to the weigh station indicating the item is man-made, and therefore not an item of produce. The method 500 then ends. In embodiments where a plurality of current images 504 are being processed, the result of the silhouette detection 510 may need to be identical with regard to at least two or more of the current images 504 before determining whether the silhouette detection 520 fails or not at 522. In some embodiments, the method 500 only proceeds from the silhouette detection 520 to the orientation check 524 when at least one current image 504 has been successful in identifying a known silhouette of a reference model, but not enough to be classified as true. When no silhouettes are detected, the method may proceed to perform glare detection.

As described above, the orientation check 524 is performed when a silhouette was detected in at least one image. The orientation check 524 is performed to confirm a man-made item is present in an image for which a silhouette was identified, but not enough of the other images confirmed the silhouette. The orientation check 526 searches for other details within the image within which a silhouette was identified, such as the presence of text, a label, angle orientation of lines of the silhouette, and other such features that may be present in the image. When confirmation is made, the method 500 outputs a signal at 526 to the weigh station indicating the item is man-made, and therefore not an item of produce. The method 500 then ends. However, if confirmation is not made, the method 500 proceeds from 526 to the glare detection 530 process.

Next, or again in parallel to the described operations of the method 500 since the reference image 502 and current image 504 were down sampled, the method 500 includes performing hotspot masking 528 on either the current image 504 as it was received or as down sampled 506. Hotspot masking 528 may be performed to adjust pixel brightness in areas of the image being processed to adjust for known bright or dark areas of the image. The hotspot masking 528, in some embodiments, may adjust pixel brightness higher or lower. The hotspot masking 528 may be performed according to one or more configuration settings in some embodiments.

Subsequently, the glare detection 530 process may be called following either the silhouette detection 520 or the orientation check 524, as described above. The glare detection 530 searches for a number of glare areas within the image output by the hotspot masking 528 process defined by pixels having a brightness greater than a certain value that occur in contiguous image areas having at least a certain length and width. When the number of such areas is sufficient in view of a glare detection threshold, the glare detection 530 process is satisfied and the method 500 outputs a signal at 532 to the weigh station indicating the item is man-made, and therefore not an item of produce. The method 500 then ends. However, if the glare detection threshold is not satisfied, the method 500 proceeds from 532 to the straight-line detection 536 process.

At some point in the performance of the method 500 prior to execution of the straight line detection 536 process, a Hough transform 534 process is performed on an image copy output by the hotspot masking 518. The Hough transform 534 process is an image feature extraction process that identifies lines in the image. The straight-line detection 536 process then evaluates lines located in the image by the Hough transform 534 process in view of a rule. The rule in some embodiments, which may be set in a configuration setting, looks for lines having a more than five lines with a length greater than 30 pixels. When there are more than five lines having a length greater than 30 pixels, the straight-line detection 536 process is satisfied and the method 500 outputs a signal at 538 to the weigh station indicating the item is man-made, and therefore not an item of produce. The method 500 then ends. However, the straight-line detection 536 process is not satisfied, the method 500 proceeds from 538 to the parallel line detection 540 process.

The parallel line detection 540 process operates against the image output by the Hough transform 534 process to determine whether there are at least two parallel lines having a length of at least ten pixels and separated by a distance of at least 25 pixels present in the image. The number of parallel lines, length thereof, and distance between may vary in different embodiments and may be configurable in some embodiments.

When satisfactory parallel lines are identified, the parallel line detection 540 process is satisfied and the method 500 outputs a signal at 542 to the weigh station indicating the item is man-made, and therefore not an item of produce. The method 500 then ends. However, if the parallel line detection 540 process is not satisfied, the method 500 proceeds outputs a signal at 542 to the weigh station indicating the item is likely an item of produce and the method 500 ends.

The method 500 is merely one example of an item substitution fraud detection process that may be defined in and executed on or at a weigh station. The various elements of the method 500 may be fewer, greater, different, and performed in a different order, in various embodiments.

Figure 6:
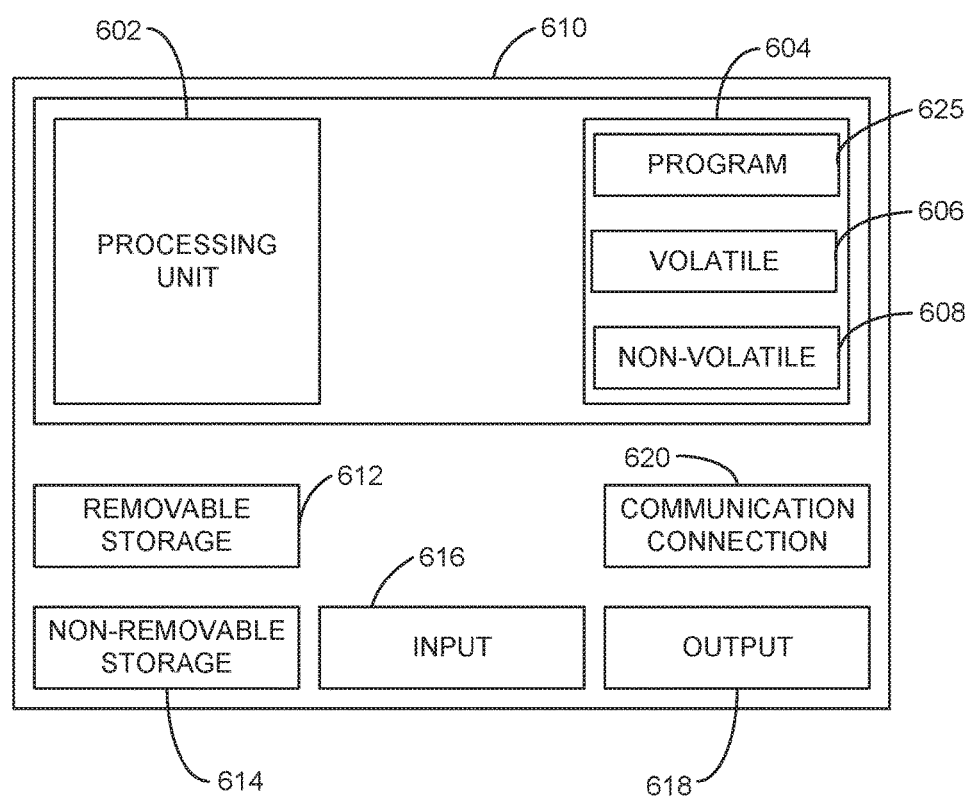
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Although the example computing device is illustrated and described as computer 610, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet. In some other embodiments, the example computing device may be in the form of a weigh station system or the computer 610 may be a computer that controls a weigh station.

In the computer 610, the memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610, and other input devices. The computer 610 may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
 receiving product identification input, a weight, and an image of an item present on a scale surface of a non-point of sale weigh station device;
 processing at least one of the weight and the image in view of the product identification input according to at least one validation process to obtain a validation result;
 when the validation result indicates validation success, outputting data to be printed on a scanable label to be affixed to the item; and
 when the validation result indicates validation failure, outputting data to be printed on a scanable label to be affixed to the item to cause a notification to be output upon presentment at a point of sale terminal indicating the validation failure.

2. The method of claim 1, wherein the product identification input includes at least one of a price per unit of weight and a product identifier to retrieve product data.

3. The method of claim 2, wherein the product data retrievable with the product identifier includes a price per unit of weight and product property data that is utilized by the at least one validation process to perform validation that a product presented matches the received product identification input.

4. The method of claim 3, wherein the price per unit of weight is retrieved based on at least a portion of the product identifier from a memory device of the non-point of sale weigh station device.

5. The method of claim 1, wherein the product identification input is received as a data item read by a scanning process or device from the image of the item present on the scale.

6. The method of claim 1, wherein the validation process includes a set of validation processes that each execute to identify one or more properties of an item presented on the scale surface as captured in the received image.

7. The method of claim 6, wherein at least one validation process is performed with regard to the received image to remove a background of the image leaving only the item presented on the scale surface and to perform at least one additional validation process that outputs the validation result, the validation result including or based at least in part on an indication of whether the presented item is a naturally occurring or man-made item, the at least one additional validation process including at least one of:
 a silhouette detection process that processes an image to leave a silhouette of the presented item which is then compared to a reference model of a man-made item and when relatively matched, outputting an indication the presented item is likely man-made;

a glare detection process that evaluates areas within the presented item image portion for distinct occurrences of glare and when a number of glare occurrences larger than a first threshold is greater than a second threshold, outputting an indication the presented item is likely man-made; and performing a Hough transform on the image of the presented item and performing at least one of a straight-line detection process and a parallel line detection process, wherein:

when the straight line detection identifies a number of straight lines longer than a third threshold greater than a fourth threshold, outputting an indication the presented item is likely man-made; and when the parallel line detection identifies at least two parallel lines each having at least a minimum length and separated by at least a minimum distance, outputting an indication the presented item is likely man-made.

8. The method of claim 7, wherein:

the received image is one of a plurality of received images, each image captured either from a different angle, zoom, or resolution;

at least one of the silhouette detection, glare detection, straight line detection, and parallel line detection processes are performed on at least two images and the output of the indication that the presented item is likely man-made is output only upon reaching the same conclusion through the respective process upon processing at least two images; and when an output of only one of the silhouette detection, glare detection, straight line detection, and parallel line detection processes output an indication that the presented item is likely man-made with regard to only a single image, performing further processing with regard to that single image to identify at least one additional feature present therein to confirm that the item present in the image is man-made and outputting an indication that the presented item is likely man-made when the at least one additional feature is present in the image.

9. The method of claim 7, wherein removing the background of the at least one image includes:

down sampling each image, of one or more received images, to a lower resolution;

subtracting a background reference image from a current image, the background reference image subtracted being of an identical resolution and captured by a respective camera that captured the current image; and performing a pixel-by-pixel comparison between reference image pixels and current image pixels and removing the pixel from the current image when the difference between current image pixel value and the reference image pixel value is lesser than a threshold value, the threshold value variable determined based on the value of one of the current image and reference image pixel values.

10. The method of claim 1, wherein the output is output to a label printer.

11. A method comprising:

receiving a product identifier and an image of an item present on a scale surface of a non-point of sale weigh station device;

processing the image in view of the product identifier according to at least one validation process to obtain a validation result; and when the validation result indicates validation success, outputting data to be printed on a scanable label to be affixed to the item; otherwise outputting data to be printed on a scanable label to be affixed to the item to cause a notification to be output upon presentment at a point of sale terminal indicating a validation failure.

12. The method of claim 11, wherein the product identifier includes at least one of a price per unit of weight and a product identifier number to retrieve product data.

13. The method of claim 12, wherein the product data retrievable with the product identifier includes a price per unit of weight and product property data that is utilized by the at least one validation process to perform validation that a product presented matches the received product identification input.

14. The method of claim 11, wherein the product identifier is received as a data item from a product scanner or as read by a scanning process from the image of the item present on the scale.

15. The method of claim 11, wherein the validation process includes a set of validation processes that each execute to identify one or more properties of an item presented on the scale surface as captured in the received image.

16. The method of claim 15, wherein at least one validation process is performed with regard to the received image to remove a background of the image leaving only the item presented on the scale surface and to perform at least one additional validation process that outputs the validation result.

17. The method of claim 16, wherein the validation result includes or is based at least in part on an indication of whether the presented item is a naturally occurring or man-made item as determined by at least one of silhouette, glare, detection, and straight line detection processes.

18. A non-point of sale self-service terminal comprising:
a product scanner including at least one imaging device;
an input device;
a scale;
a label printer;
a processor; and
a memory device storing instructions executable by the processor to perform data processing activities comprising:

receiving a product identifier, from the input device or the product scanner, and an image, from at least one imaging device of the product scanner, of an item present on the scale;

processing the image in view of the product identifier according to at least one validation process to obtain a validation result; and when the validation result indicates validation success, printing, with the libel printer, a scanable label to be affixed to the item; otherwise printing, with the label printer, a scanable label to be affixed to the item to cause a notification to be output upon presentment at a point of sale terminal indicating a validation failure.

19. The non-point of sale self-service terminal of claim 18, further comprising:
a network interface device; and
wherein the data processing activities, when the validation result does not indicate success, further comprise:

generating a unique identifier and associating a further data item therewith indicating the validation failure;

encoding the unique identifier and the further data item in the data for printing to the scanable label;

transmitting, via the network interface device, the unique identifier and the further data item to a database accessible by point of sale terminals upon a scan of the printed scanable label affixed to the item.

20. The non-point of sale self-service terminal of claim 19, wherein when the validation result indicates validation success, the data processing activities further comprise:

retrieving price per unit of weight data from the memory device based on the product identifier;

calculating a price based on a weight received from the scale multiplied by the retrieved price per unit of weight;

encoding the price in the data for printing on the scanable label to be affixed to the item.

* * * * *